US012770991B2

(12) United States Patent
Lee et al.

(10) Patent No.: US 12,770,991 B2
(45) Date of Patent: Oct. 20, 2026

(54) WELD BEAD AND SECONDARY BATTERY MODULE INCLUDING THE SAME

(71) Applicants: SK On Co., Ltd., Seoul (KR); SK Innovation Co., Ltd., Seoul (KR)

(72) Inventors: Seul Gi Lee, Daejeon (KR); Won Seok Choi, Daejeon (KR); Jae Hun Kim, Daejeon (KR); Ki Dong Lee, Daejeon (KR)

(73) Assignees: SK On Co., Ltd., Seoul (KR); SK Innovation Co., Ltd., Seoul (KR)

( * ) Notice: Subject to any disclaimer, the term of this patent is extended or adjusted under 35 U.S.C. 154(b) by 452 days.

(21) Appl. No.: 18/418,511

(22) Filed: Jan. 22, 2024

(65) Prior Publication Data

US 2024/0258658 A1 Aug. 1, 2024

(30) Foreign Application Priority Data

Jan. 31, 2023 (KR) ........................ 10-2023-0012769

(51) Int. Cl.

| | |
|---|---|
| ***H01M 50/54*** | (2021.01) |
| ***B23K 26/21*** | (2014.01) |
| ***H01M 50/505*** | (2021.01) |
| ***H01M 50/51*** | (2021.01) |
| ***H01M 50/522*** | (2021.01) |
| *B23K 101/36* | (2006.01) |
| *B23K 103/12* | (2006.01) |

(52) U.S. Cl.

CPC ............. *H01M 50/54* (2021.01); *B23K 26/21* (2015.10); *H01M 50/505* (2021.01); *H01M 50/51* (2021.01); *H01M 50/522* (2021.01); *B23K 2101/36* (2018.08); *B23K 2103/12* (2018.08)

(58) Field of Classification Search

CPC ..... H01M 50/54; H01M 50/51; H01M 50/522

See application file for complete search history.

(56) References Cited

U.S. PATENT DOCUMENTS

2022/0407187 A1* 12/2022 Chung ................ B23K 26/242

FOREIGN PATENT DOCUMENTS

| | | | | |
|---|---|---|---|---|
| CN | 110114904 A | 8/2019 | | |
| EP | 4064448 A1 | 9/2022 | | |
| KR | 2021-0061945 A | 5/2021 | | |
| KR | 2022-0036070 A | 3/2022 | | |
| WO | 2016/017683 A1 | 2/2016 | | |
| WO | WO-2021101300 A1 * | 5/2021 | .......... | H01M 50/534 |

OTHER PUBLICATIONS

Itoi et al.; Microstructure Evolution of a Dissimilar Junction Interface Between an Al Sheet and a Ni-coated Cu Sheet Joined by Magnetic Pulse Welding; Materials Characterization, 118; pp. 142-148; 2016.

Huang et al.; Investigation of Metal Mixing in Laser Keyhole Welding of Dissimilar Metals; Materials and Design, 195; 109056; 2020.

European Patent Office; Appl. 24154045.9; Extended European Search Report; Jul. 15, 2024.

* cited by examiner

*Primary Examiner* — Olatunji A Godo

(74) *Attorney, Agent, or Firm* — Jones Day

(57) ABSTRACT

A battery module including a plurality of battery cells each including an electrode tab and at least one bus bar comprising a plate connected to each of the electrode tabs via a weld bead, wherein the plate and the weld bead comprises a first metal at a particular concentration range and wherein the weld bead has particular dimensions.

15 Claims, 5 Drawing Sheets

WELD BEAD AND SECONDARY BATTERY MODULE INCLUDING THE SAME

CROSS-REFERENCE TO RELATED APPLICATIONS

This application claims priority under 35 U.S.C. § 119 to Korean Patent Application No. 10-2023-0012769, filed on Jan. 31, 2023, in the Korean Intellectual Property Office, the disclosure of which is incorporated herein by reference in its entirety.

TECHNICAL FIELD

The following disclosure relates to a battery module, and more particularly, to a battery module with improved mechanical and electrical characteristics.

BACKGROUND

Recently, demand for high-capacity, high-output secondary batteries have been increasing, and with it, the demand for developing secondary batteries that exhibit high energy density, high performance, and high reliability to meet the demand. When constructing a cathode/anode in manufacturing a secondary battery, the cathode/anode are joined to electrically connect cells, and dissimilar joining methods using aluminum and copper members, etc., are generally widely used. Since both the aluminum and copper members have excellent electrical conductivity and thermal conductivity, they are widely used in electronic and electrical components, a heat dissipation component, etc. In order reduce the size and weight of the electronic, electrical, and heat dissipation components, etc., a joint that joins the copper member and aluminum member is necessary.

In particular, an electrical connection between cells should exhibit a high level of reliability. Various methods such as ultrasonic welding, laser welding, and mechanical (bolt/nut) joining are often used, but in order to respond to increasing demands for higher energy density, laser welding is being used as the most common joining method.

Laser welding may be performed using various laser welding methods. For example, a method of lap-welding a single or a plurality of electrode tabs and bus bars may be used. However, in lap welding, frequent welding defects lead to weak welding. Further, electrode tabs are typically bent and cut within a unit module for welding, resulting in increased processing and management costs.

In addition, welding is performed by forming various plating layers on the bus bar to improve physical properties, corrosion resistance, etc., but due to changes in surface properties such as laser reflectivity and surface tension depending on a type of metals included in the plating layer, weld beads with different shapes and characteristics are formed even under the same welding conditions, so defects may occur.

In addition, during the laser welding of dissimilar materials, intermetallic compounds (IMC) are generated. The intermetallic compounds (IMCs) have physical properties such as high electrical resistance and hardness, which may adversely affect the mechanical characteristics of a welded area, such as brittleness and may adversely affect battery characteristics due to an increase in resistance when making electrical connections between battery cells. In addition, there is a possibility that defects such as one-sided welding may occur due to non-uniform welding, which may adversely affect the mechanical and electrical characteristics of the welded area.

Therefore, there is an urgent need for technology that can minimize defects under differing welding conditions, secure stable welding quality, and secure excellent mechanical characteristics, electrical characteristics, and welding reliability.

SUMMARY

An embodiment of the present invention is directed to providing a weld bead that has excellent mechanical and electrical characteristics by optimizing formation of an intermetallic compound (IMC) to secure stable quality, and a battery module including the same.

Another embodiment of the present invention is directed to providing a weld bead that can exhibit optimal quality depending on the influence of various factors affecting welding quality, and a battery module including the same.

Objects of the present disclosure are not limited to the above-mentioned objects. That is, other objects that are not mentioned may be obviously understood by those skilled in the art to which the present disclosure pertains from the following description.

In one general aspect, an embodiment of the present disclosure may provide a battery module including: a plurality of battery cells each including an electrode tab; and at least one bus bar connected to a plurality of electrode tabs to electrically connect the plurality of battery cells to each other, in which the bus bar includes a plate on which a plurality of holes are formed, the plate includes a first metal, the electrode tabs of the plurality of battery cells are each inserted to correspond to the plurality of holes of the plate, the electrode tab inserted into the hole and the plate are coupled to each other by a weld bead, and the weld bead satisfies Equations 1 and 2 below:

$$5 < C_{M1}(\text{wt }\%) < 50 \quad \text{[Equation 1]}$$

$$0.1 < H/W \text{ ratio} < 0.85. \quad \text{[Equation 2]}$$

In Equation 1 above, $C_{M1}$ denotes a concentration of the first metal contained in the weld bead. In Equation 2, H denotes a height of the weld bead and W denotes a width of the weld bead, wherein the direction of H and W is based on a cross section of the weld bead in a thickness direction of the plate.

Said differently, the present disclosure provides a bus bar configured to electrically connect the battery cells via respective electrode tabs, the bus bar comprising a plate of a first metal, the bus bar having holes for retention of the respective electrode tabs;

wherein a particular electrode tab is coupled to the plate via a weld bead satisfying Equations 1 and 2 below:

$$5 < C_{M1}(\text{wt }\%) < 50 \quad \text{[Equation 1]}$$

$$0.1 < H/W \text{ ratio} < 0.85, \quad \text{[Equation 2]}$$

wherein:

$C_{M1}$ denotes the concentration of the first metal contained in the weld bead;

H denotes the height of the weld bead; and

W denotes the width of the weld bead.

In one embodiment, the first metal may be copper.

In one embodiment, the weld bead may satisfy Equations 3 and 4 below:

$$10 < C_{M1}(\text{wt }\%) < 50 \quad \text{[Equation 3]}$$

$$0.15 < H/W \text{ ratio} < 0.85. \quad \text{[Equation 4]}$$

In one embodiment, the plate may include a plating layer containing a second metal formed on a surface thereof. The second metal may be at least one selected from the group consisting of nickel, silicon, magnesium, iron, manganese, zinc, chromium, lithium, calcium, and an alloy of any of the foregoing.

For example, in one embodiment, the second metal may be nickel. In one embodiment, the weld bead may satisfy Equations 5 and 6 below:

$$10 < C_{M1}(\text{wt }\%) < 50 \quad \text{[Equation 3]}$$

$$0.15 < H/W \text{ ratio} < 0.75. \quad \text{[Equation 4]}$$

In one embodiment, the plate may further include a second plating layer that contains a third metal and which is formed on the first plating layer. In one embodiment, the third metal may be tin.

In one embodiment, the weld bead may satisfy Equations 7 and 8 below:

$$5 < C_{M1}(\text{wt }\%) < 50 \quad \text{[Equation 7]}$$

$$0.1 < H/W \text{ ratio} < 0.45. \quad \text{[Equation 8]}$$

In one embodiment, the weld bead may include a cover part having a convex shape that covers the hole and a pillar part inserted into the hole.

In one embodiment, the weld bead may satisfy Equation 9 below.

$$0 < A < 21T^2. \quad \text{[Equation 9]}$$

In Equation 9 above, A denotes a cross-sectional area of the weld bead based on the cross section of the weld bead in the thickness direction of the plate, and T is a thickness of the electrode tab.

In one embodiment, the weld bead may have left-right symmetry with respect to a center line of the hole. In one embodiment, the battery module exhibits a L1:L2 ratio of 1:1 to 1.2, wherein L1 and L2 are defined as the shortest distance from a center line of the weld bead to opposing boundary points of the weld bead, and wherein if L1 and L2 are different, L2 is the larger value.

In one embodiment, the plurality of battery cells may be pouch-type battery cells.

In another aspect, the present disclosure provides a method of making a battery module comprising:

- providing a plurality of battery cells, each including an electrode tab;
- providing at least one bus bar comprising a plate comprising plurality of holes;
- wherein the plate comprises a first metal;
- inserting an electrode tab of each of the plurality of battery cells into each of the plurality of holes in the plate such that the electrode tab protrudes through the plate to create a protruding portion of the electrode tab; and
- irradiating the plate and electrode tab under conditions effective to bond the electrode tab to the plate, thereby creating a weld bead,
- wherein the weld bead satisfies Equations 1 and 2 below:

$$5 < C_{M1}(\text{wt }\%) < 50 \quad \text{[Equation 1]}$$

$$0.1 < H/W \text{ ratio} < 0.85, \quad \text{[Equation 2]}$$

wherein:

$C_{M1}$ denotes the concentration of the first metal in the weld bead;

H is the height of the weld bead; and

W is the width of the weld bead.

In one embodiment, the weld bead and electrode tab are irradiated with a laser at an angle oblique to a central axis of the electrode tab.

In one embodiment, the first metal is copper.

In one embodiment, the plate comprises a plating layer comprising a second metal formed on a surface of the plate. In one embodiment, the second metal comprises at least one selected from the group consisting of nickel, silicon, magnesium, iron, manganese, zinc, chromium, lithium, calcium, and any alloy of any of the foregoing. In one embodiment, the second metal is nickel.

In one embodiment, the plate may further include a second plating layer on the first plating layer that contains a third metal formed. In certain embodiments, the third metal is tin.

DETAILED DESCRIPTION OF EMBODIMENTS

Figure 1:
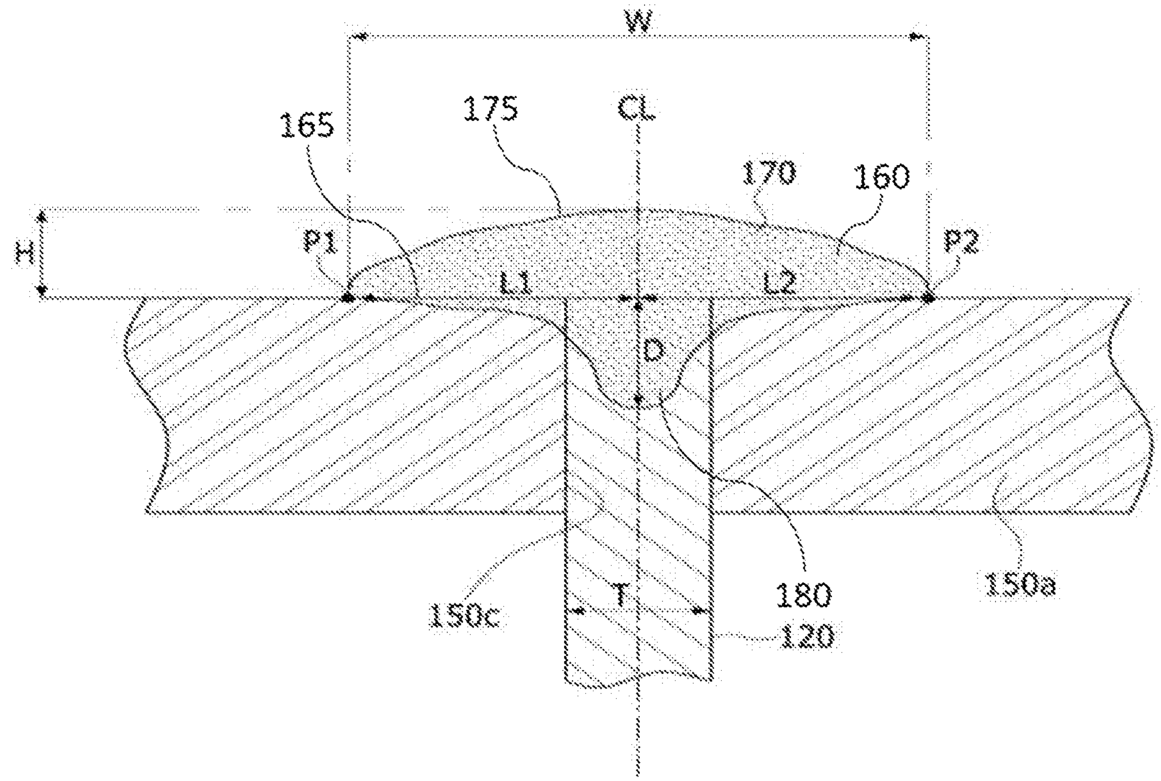
FIG. 1 is a schematic cross-sectional diagram illustrating the formation of a weld bead together with a plate by heating and melting an end portion of an electrode tab that penetrates through a hole of the plate with a laser.

Hereinafter, a battery module of the present disclosure will be described in detail with reference to the accompanying drawings. The drawings provided herein are provided by way of example so that the spirit of the present disclosure can be sufficiently transferred to those skilled in the art. Therefore, the present disclosure is not limited to the accompanying drawings provided below but may be modified in many different forms. In addition, the accompanying drawings suggested below will be exaggerated in order to clear the spirit and scope of the present disclosure. Technical terms and scientific terms used in the present specification have the general meaning understood by those skilled in the art to which the present disclosure pertains unless otherwise defined, and a description for the known function and configuration unnecessarily obscuring the gist of the present disclosure will be omitted in the following description and the accompanying drawings.

In the drawings, the following elements are used: 110: Battery cell, 120: Battery tab, 150: Bus bar, 150*a*: Plate, 150*c*: Hole, 151: Insertion part, 151*a*: Tab connection part, 151*b*: Groove, t1: Thickness direction of plate, t2: Thickness direction of electrode tab, 160: Cover part of weld bead, 165: Bonding interface of weld bead, 170: Weld bead, 175: Surface of weld bead, 180: Pillar part of weld bead; L: Laser, T: Thickness of electrode tab, H: Height of weld bead, W: Width of weld bead, CL: Center line of hole, P1: Boundary point on left, P2: Boundary point on right.

Also, the singular forms used in the specification are intended to include the plural forms as well, unless the context specifically dictates otherwise.

In this specification, terms such as first, second, etc., are used for the purpose of distinguishing one component from another component, not in a limiting sense.

In this specification, the terms "comprise", "include," "contain," and "have," or any grammatical variations thereof (e.g., "comprising," "including," etc.), means that a feature or element described in the specification is present, and unless specifically limited, it does not preclude in advance the possibility that one or more other features or components may be added.

In this specification, when a part of a film (layer), a region, a component, etc. is "on" or "above" another part, this includes not only the case where the part is in contact with and directly on another part, but also the case where another film (layer), other regions, other components, etc., are also interposed therebetween.

As "$C_{M1}$", as used in this specification, refers to a concentration of a first metal contained in a weld bead, unless otherwise specified.

Unless otherwise specified, H and W used in this specification are based on a cross section of the weld bead in a thickness direction of a plate, and H refers to a height of the weld bead protruding from a surface of the plate, and W refers to a width of the weld bead in a major axis direction.

The laser welding as disclosed herein provides an improved method over conventional welding methods. For example, when method of lap-welding a single or a plurality of electrode tabs and a bus bar is performed, welding defects, such as weak welding after welding, may result and necessitate bending and cutting of multiple electrode tabs within a unit module for welding, resulting in increased processing and management costs.

Welding performed by forming various plating layers on the bus bar may improve the physical properties, e.g., corrosion resistance, etc., of an area welded by conventional methods. However, due to changes in surface properties, such as laser reflectivity and surface tension, depending on specifications of plating, weld beads with different shapes and characteristics may be formed even under the same welding conditions, so defects of the welded area may still occur.

In addition, during laser welding of dissimilar materials, intermetallic compounds (IMC) may be generated. The intermetallic compounds (IMCs) have physical properties such as high electrical resistance and hardness, which may adversely affect the mechanical characteristics, e.g., brittleness, of a welded area which may adversely affect battery characteristics due to an increase in resistance when making electrical connections between battery cells. In addition, there is a possibility that defects, such as one-sided welding, may occur due to non-uniform welding, which may adversely affect the mechanical and electrical characteristics of the welded area.

Therefore, in one aspect, the present disclosure provides a battery module including:

- a plurality of battery cells, each including an electrode tab; and
- at least one bus bar electrically connected to each electrode tab of each of the plurality of battery cells, thereby connecting the plurality of battery cells to each other,
- wherein the bus bar comprises a plate comprising a plurality of holes,
- wherein the plate comprises a first metal,
- wherein each of the electrode tabs of the plurality of battery cells are inserted to a corresponding hole in the plurality of holes of the plate,
- and wherein the electrode tab and the plate are coupled to each other by a weld bead, and
- wherein the weld bead satisfies Equations 1 and 2 below:

$$5 < C_{M1}(\text{wt }\%) < 50 \quad \text{[Equation 1]}$$

$$0.1 < H/W \text{ ratio} < 0.85 \quad \text{[Equation 2]}$$

In Equation 1 above, $C_{M1}$ denotes a concentration of the first metal contained in the weld bead. In Equation 2, H denotes a height of the weld bead and W denotes a width of the weld bead, wherein the direction of H and W is based on a cross section of the weld bead in a thickness direction of the plate.

Said differently, the present disclosure provides a bus bar configured to electrically connect the battery cells via respective electrode tabs, the bus bar comprising a plate of a first metal, the bus bar having holes for retention of the respective electrode tabs;

wherein a particular electrode tab is coupled to the plate via a weld bead satisfying Equations 1 and 2 below:

$$5 < C_{M1}(\text{wt }\%) < 50 \quad \text{[Equation 1]}$$

$$0.1 < H/W \text{ ratio} < 0.85, \quad \text{[Equation 2]}$$

wherein:

$C_{M1}$ denotes the concentration of the first metal contained in the weld bead;

H denotes the height of the weld bead; and

W denotes the width of the weld bead.

The welding methods disclosed herein ("T joint methods"), in which a plurality of electrode tabs are inserted into a plurality of holes in a plate and joined by the weld bead, is advantageous in that the processing shape of all electrode tabs of all battery cells constituting a module are the same without bending or cutting the electrode tabs of the battery cells into more than one shape. Battery cells processed in this way are arranged to form a stack after which the plate may be assembled in the direction in which the electrode tabs will be inserted for electrical connection. In this case, the plate may have a predetermined interval through which the electrode tab may penetrate, may be provided with holes (slots) corresponding to each electrode tab, and have a surface that protrudes by a certain amount in a direction in which the electrode tab penetrates along an outer periphery of a hole into which it is inserted. After being assembled in this way, the electrode tab protrudes through the plate, and then welding may be performed, e.g., by irradiating with a laser beam to the protruding welded area.

In the composition of the weld bead formed by the above welding method, the mechanical and electrical characteristics of the weld bead may be enhanced by adjusting the concentration of the first metal ($C_{M1}$) included in the weld bead. In certain embodiments, when the weld bead satisfies Equation 1 above (e.g., $C_{M1}$ is a value between 5 wt % and 50 wt %), the mechanical and electrical characteristics of the weld bead and battery module may be improved compared to weld beads and battery module using materials and methods currently used in the art. When $C_{M1}$ is 50 or more, there is a problem of increased intermetallic compound (IMC) formation and crack occurrence. Conversely, $C_{M1}$ is 5 or less, there is a problem in that one-sided welding occurs and the welding quality deteriorates. In certain embodiments, $10<C_{M1}$ (wt %)<40 (e.g., $C_{M1}$ is a value between 10 wt % and 40 wt %). In yet further embodiments $20<C_{M1}$ (wt %)<30 (e.g., $C_{M1}$ is a value between 20 wt % and 30 wt %).

FIG. 1 is a schematic cross-sectional diagram illustrating one embodiment of a weld bead 170 formed by heating and melting an end portion of an electrode tab 120 which penetrates through a hole 150*c* of a plate 150*a* of a bus bar with a laser according to an example of the present disclosure. In FIG. 1, H denotes a height of the weld bead 170, W denotes a width of the weld bead 170.

In certain embodiments, it is possible to yield excellent welding quality when the weld bead satisfies Equation 1 and Equation 2 above (e.g., 0.1<H/W ratio<0.85). When the H/W ratio is 0.85 or more, problems may arise, such as microcracks and reduced coupling stability between bus bars arising from narrowing bread width W due to increased resistance in the welded area due to excessive formation of the intermetallic compounds (IMC) on the interface between the electrode tab and the bus bar. When the H/W ratio is 0.1 or less, other problems may arise, such as decreased strength of the welded area and reduced stability due to non-welding.

In one embodiment, the first metal may be copper. In this case, the weld bead may satisfy Equations 3 and 4 below.

$$10 < C_{M1}(\text{wt } \%) < 50 \quad \text{[Equation 3]}$$

$$0.15 < H/W \text{ ratio} < 0.85 \quad \text{[Equation 4]}$$

Equations 3 and 4 above are specific embodiments of Equations 1 and 2 above, which represent the most preferable range when copper is used as the first metal. In particular, when welding dissimilar materials (e.g., when the material of the electrode tab and the material of the plate are different from each other, such as in Cu—Al dissimilar welding in which the electrode tab is made of aluminum and the plate is made of copper), using a weld bead that satisfies Equations 3 and 4 above optimizes the generation of intermetallic compounds (IMC), such as $Al_xCu_y$ and yields stable welding and measurably improves mechanical characteristics, e.g., tensile strength of the welded area, and electrical characteristics, e.g., reduction in module resistance.

In one embodiment, the plate may include a first plating layer formed on a surface of the plate and containing a second metal. By including a first plating layer on a surface of the plate, it is possible to impart improved mechanical characteristics and electrochemical stability to the weld and battery module. The second metal may contain Ni, Si, Mg, Fe, Mn, Zn, Cr, Li, or Ca, or any alloy of any of the foregoing. In certain embodiments, the second metal may be nickel (Ni). By using nickel, it is possible to impart excellent corrosion resistance along with improved mechanical characteristics to the weld and battery module.

In certain embodiments, a first plating layer containing a second metal, wherein the second metal is nickel, may be formed on the surface of a plate comprising copper as the first metal. In this case, weld beads with different shapes and characteristics may be formed even under the same welding conditions due to changes in surface properties, such as laser reflectivity or surface tension. In certain embodiments, the ranges of $C_{M1}$ (wt %) and H/W ratio of the weld bead that may result in the best quality as a first plating layer comprising nickel is formed are as shown in Equations 5 and 6 below.

$$10 < C_{M1}(\text{wt } \%) < 50 \quad \text{[Equation 5]}$$

$$0.15 < H/W \text{ ratio} < 0.75 \quad \text{[Equation 6]}$$

In one embodiment, the plate may further include a second plating layer on the first plating layer that contains a third metal formed. In certain embodiments, the third metal may be tin. In addition to excellent mechanical characteristics and corrosion resistance, using tin optimizes the generation of the intermetallic compounds (IMC) during the welding process. Without wishing to be bound by theory, it is believed that if a tin plating layer is formed directly on the surface of the plate without the first plating layer, whiskering may occur.

In one embodiment, a plate comprises a second plating layer comprising tin formed on a first plating layer comprising nickel. In this case, weld beads with different shapes and characteristics may still be formed even under the same welding conditions due to changes in surface properties, such as laser reflectivity or surface tension. In certain embodiments, the ranges of $C_{M1}$ (wt %) and H/W ratio of the weld bead that may result in the best quality as a tin-plating layer is formed are as specified in Equations 7 and 8 below.

$$5 < C_{M1}(\text{wt } \%) < 50 \quad \text{[Equation 7]}$$

$$0.1 < H/W \text{ ratio} < 0.45 \quad \text{[Equation 8]}$$

A weld bead satisfying Equation 7 above may display excellent spreadability over the plate (bus bar) during tin plating, and thus, the welding can be made with a lower copper content, thereby satisfying Equation 7 (e.g., $C_{M1}$ is between 5 wt % and 50 wt %). When Equations 7 and 8 above are satisfied, the mechanical and electrical characteristics of the weld and battery module may be further improved.

Weld bead with various shapes and qualities may be formed depending on the welding environment, and as such, the present disclosure describes the influence of various factors affecting the welding quality and the conditions under which the best quality may be achieved, which are explained in further detail below. $C_{M1}$ of any given composition of weld bead may be measured using an energy dispersive spectroscopy (EDS) method. H/W ratio of any given composition of the weld bead may be measured by scanning electron microscopy (SEM) or optical microscope (OM) image analysis. These are only examples and are not necessarily limited thereto. Other methods that measure $C_{M1}$ and H/W ratio may be used without limitation.

Hereinafter, a battery module will be described in detail with reference to accompanying drawings and following terms.

Figure 5:
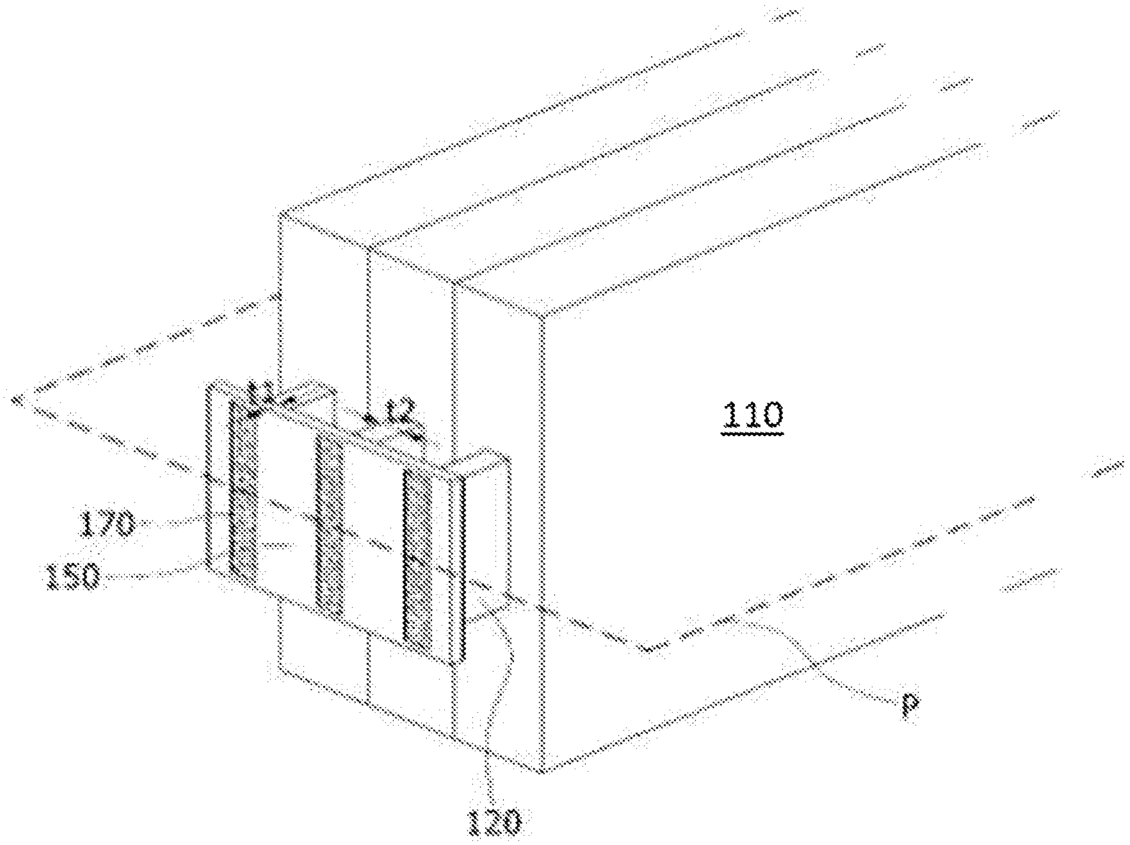
FIG. 5 is a diagram illustrating a virtual surface that generates a cross section of a battery module in a thickness direction of a plate.

A cross section of the weld bead in the thickness direction of the plate may refer to a cross section created by the cutting or intersecting of a virtual surface (virtual surface with the thickness direction as in-plane) parallel to the thickness direction of the plate or may refer to a welded cross section that is created by physically cutting the weld bead to minimize the area of a weld bead. One practical example is illustrated in FIG. 5, wherein the cross section of the weld bead 170 refers to the cross section created by the intersection of virtual surface p, which is parallel to a thickness direction t1 of the plate. At the same time, the virtual surface p is also parallel to a thickness direction t2 of the electrode tab 120. A bus bar 150 and each battery cell 110 is also intersected by the virtual surface p.

Figure 2:
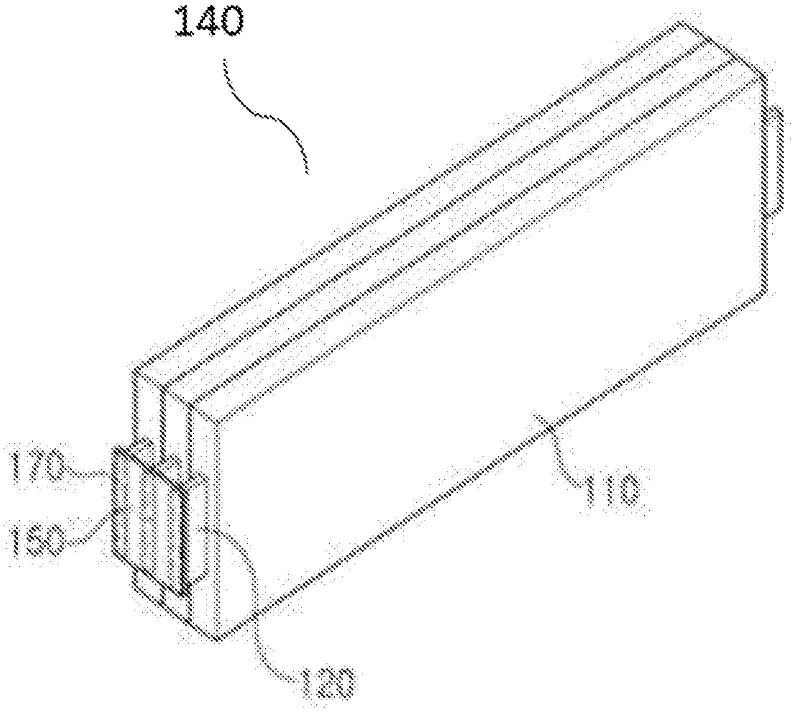
FIG. 2 is a diagram illustrating a battery module including a weld bead according to an implementation.
Figure 3:
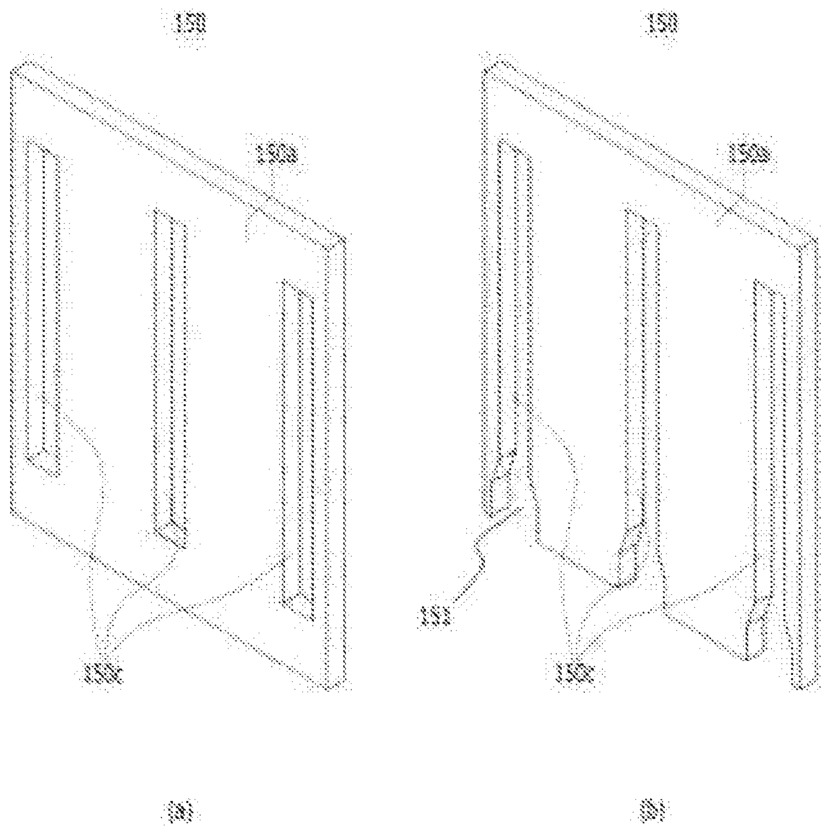
FIGS. 3A and 3B are diagrams illustrating example bus bars that may be included in a battery module as disclosed herein.

FIG. 2 is a diagram showing battery module 140 comprising a stack of battery cells 110 according to an embodiment of the present disclosure, wherein the battery tabs 120 of each battery cell 110 are electrically connected by a bus bar 150. Weld beads 170 are formed by melting an end portion of an electrode tab 120 of the bus bar 150. FIGS. 3A and 3B provide diagrams illustrating a bus bar 150 provided in the battery module according to an embodiment of the present disclosure. As illustrated in FIGS. 2 and 3A and 3B, the battery module according to an embodiment of the present disclosure is configured to include the plurality of battery cells 110 and electrode tabs 120 drawn out from the battery cells 110.

FIG. 3A provides one exemplary embodiment, wherein a battery module of the present disclosure is configured to include a bus bar 150, which includes a plate 150*a* and a hole 150*c* formed on the plate. In this case, the plate may include a plurality of holes 150*c* that can accommodate each of the plurality of electrode tabs 120. Each hole 150*c* may have a shape and size corresponding to the cross section of the electrode tab 120 so that the end portion of the electrode tab 120 may be inserted into the hole 150*c*.

In FIG. 3B provides another exemplary embodiment, wherein each hole 150*c* may include an insertion part 151 with one side open so that the electrode tab 120 may be slidably inserted therein. In certain embodiments, the insertion part 151 may have a tapered shape that widens toward an open side so that the electrode tab 120 may be easily slidably inserted into the hole 150*c*, although the shape of the insertion portion 151 is not limited thereto. When both end portions of the hole 150*c* are blocked, as illustrated in FIG. 3A, the electrode tab 120 may be inserted into the hole 150*c* of the plate 150*a* in the protruding direction of the electrode tab 120, and when one end portion of the hole 150*c* is open as illustrated in FIG. 3B, the electrode tab 120 may be inserted into the hole 150*c* of the plate 150*a* in an erection direction (width direction) of the electrode tab through the insertion part 151.

In FIGS. 3A and 3B, a plurality of holes 150*c* may be formed in a plate 150*a*, and the plurality of welded battery cells 110, as shown in FIG. 2, may be electrically connected by welding the electrode tabs 120 inserted into each hole 150*c*.

In one embodiment of a battery module according to the present disclosure, battery cells 110 are connected by inserting the electrode tab 120 into the hole 150*c* formed in the plate 150*a* and then welding the electrode tab 120. In contrast to the related art, it is not necessary to separately modify the shape of the electrode tab 120 by using the methods disclosed herein.

In one embodiment, the number of holes 150*c* formed in the plate 150*a* may correspond to the number of battery cells 110 to be connected. A plate 150*a* may be configured to accommodate any number of battery cells 110, each of which may be electrically connected without modifying the shape of the electrode tab 120, regardless of the number of battery cells 110 to be connected.

Figure 4:
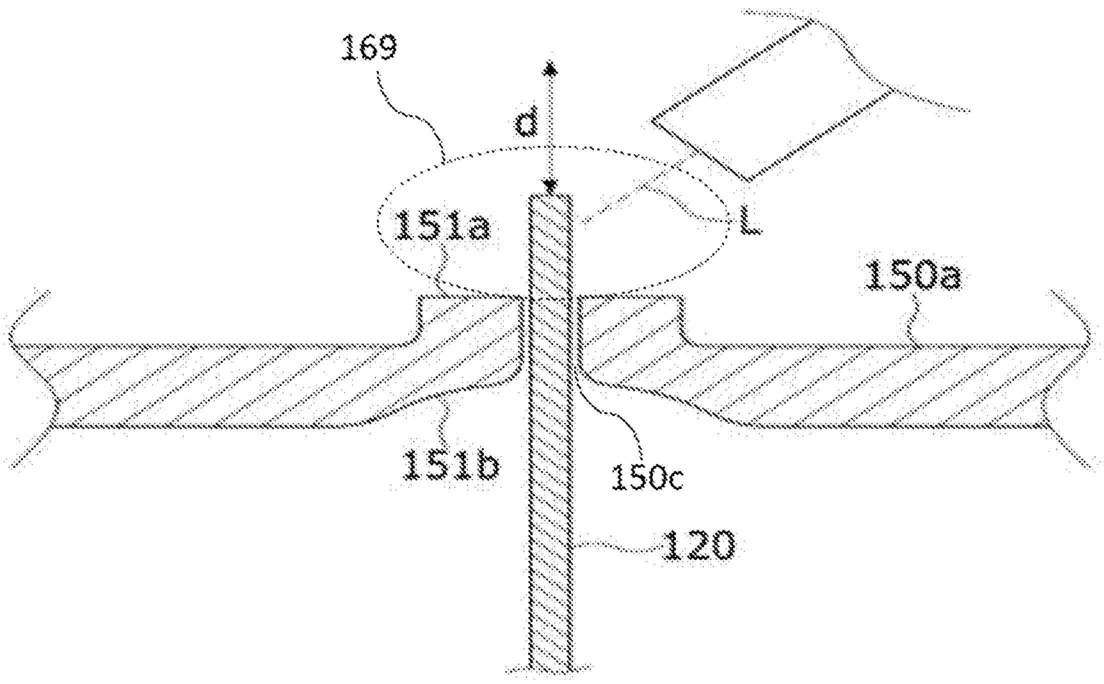
FIG. 4 is a cross-sectional diagram illustrating a welding process to bond an electrode tab to a plate using a laser.

In one embodiment, the plate 150*a* forming the bus bar 150 includes a plurality of holes 150*c* positioned at preset intervals and the electrode tab 120 inserted through the hole 150*c* is welded such that a plurality of battery cells 110 may be electrically connected through the bus bar 150. In certain embodiments, each of the plurality of holes 150*c* may be a slit shape, as depicted in FIGS. 3A and 3B. FIG. 4 is a diagram demonstrating irradiation of an electrode tab 120 with a laser L according to another embodiment of the present disclosure. As illustrated in FIG. 4, the electrode tab 120 may be irradiated obliquely by the laser L with respect to the longitudinal direction d of the electrode tab 120 that is inserted into the hole 150*c* of a plate 150*a* and protrudes in longitudinal direction d. The plate may be configured to have a tab connection part 151*a* and a 151*b* groove. Accordingly, when irradiating on a surface of the electrode tab 120 distal to the battery cell, risk of an accident caused by directly irradiating the battery cell 110 with the laser L may be minimized, and further, by obliquely irradiating the electrode tab 120 with laser L, the welding process may be visually confirmed, thereby making it possible to improve the quality and production speed of the battery module.

In the battery modules of the present disclosure, weld beads of various shapes can be obtained by making the electrode tab 120 penetrate through a hole 150*c* of the plate 150*a* and then laser-welding the electrode tab 120. As described above, the present disclosure describes the influence of various factors affecting the welding quality and describes the ranges and conditions of $C_{M1}$ and H/W ratio that may yield the best quality battery module. When these range and conditions are satisfied, even if the welding conditions change during welding, such as generation of a heat gradient or change in laser irradiation method, it is possible to produce consistent welding quality (e.g., improved welding strength, excellent electrical characteristics of the welded area, etc.) in a stable and reproducible manner.

Referring back to FIG. 1, in one embodiment, a weld bead 170 may include a cover part 160 having a convex shape that covers a hole 150*c* of the plate 150*a* and a pillar part 180 inserted into the hole 150*c*. In certain embodiments, the pillar part 180 refers to an area charged into the hole 150*c* on a line connecting boundary points P1 and P2 on the left and right where a bonding interface 165 of the weld bead and a surface of the weld bead 175 meet. The bonding interface 165 may include an interface wherein the weld bead is bonded to the plate ("plate boundary surface") and an interface wherein the weld bead 170 is bonded to the electrode tab 120 ("electrode tab boundary surface"). Whereas in related art, such as the lap welding method during laser welding, the present disclosure provides methods wherein t welding is performed by protruding the electrode tab 120 through the plate 150*a*, and then irradiating the laser beam to the protruding area, so that a weld bead 170 having a shape that includes a cover part 160 and a pillar part 180 may be created by the welding method.

As illustrated in FIG. 1, the width W of the weld bead may be the width of the cover part 160, based on the cross section of the weld bead 170. Specifically, the width W of the weld bead 170 may refer to a distance between two boundary points p1 and p2 on the left and right where the bonding interface of the weld bead 165 and the surface of the weld bead 175 meet in the cross section of the weld bead in the thickness direction of the plate. The example illustrated in FIG. 1 is a case where the two opposing boundary points p1 and p2 on the left and right are located at the same height, though this may not necessarily be the case in all embodiments. In embodiments where the two opposing boundary points p1 and p2 on the left and right are not located at the same height, the width of the weld bead W may be defined as the minimum distance between two opposing boundary points p1 and p2.

As illustrated in FIG. 1, the height H of the weld bead may be a maximum height of the cover part 160, based on the cross section of the weld bead 170. In certain embodiments, the height H of the weld bead may be the shortest distance between the virtual line connecting the two opposing boundary points p1 and p2 and the point of the cover part 160 that is furthest from the bonding interface 165 or a virtual line connecting the two opposing boundary points p1 and p2.

The width and height of a weld bead, having properties and characteristics according to any embodiment disclosed herein, determine the cross-sectional area of the weld bead. In certain embodiments, the weld bead satisfies Equations 1 and 2, and optionally one or more of Equations 3, 4, 5, 6, 7, and/or 8 and further satisfy Equation 9 below.

$$0 < A < 21T^2 \quad \text{[Equation 9]}$$

In Equation 9 above, A denotes the cross-sectional area of the weld bead, wherein the cross section is described herein (e.g., created by the intersecting of a virtual surface (with the thickness direction as in-plane) parallel to the thickness direction of the plate), and T is the thickness of the electrode tab.

A weld bead, prepared and having properties as disclosed according to any embodiment disclosed herein, may have a cross-sectional area A of less than 21T2. When the cross-sectional area is more than 21T2, several types of problems may occur, such as increased generation of intermetallic compound (IMC), decreased welding strength, and occurrence of cracks in the welded area. In certain embodiments, a weld bead may have a cross-sectional area of $T^2$ to $12T^2$, and more advantageously, $3T^2$ to $12T^2$. When a weld bead is prepared having a cross-sectional area satisfying these conditions, improved tensile strength and low contact resistance may be achieved, thereby imparting excellent and consistent characteristics of the final weld without being substantially affected by the welding conditions.

In certain embodiments, the electrode tab may comprise aluminum ("Al material") or copper ("Cu material"). In certain embodiments, the Al material may comprise aluminum at a purity of 90% or higher, and specifically may comprise aluminum with a purity of 95% or higher, 99% or higher, or 99.5% or higher. In one embodiment, the Al material may consist essentially of or consist of Al. As an example, the Al material may be industrial pure aluminum, such as a commercially available product, e.g., Al1000 series (UNS #) such as Al1050, Al1100, or Al1200. The Cu material may comprise copper at a purity of 98% or higher, 99% or higher, or 99.3% or higher. In one embodiment, the Cu material may consist essentially of or consist of Cu. As an example, the Cu material may be industrial pure copper, such as a commercially available product, e.g., C10100 to C13000 series (UNS #) such as C11000, C10100, C10200, and C12500.

In the battery module according to the present disclosure, the electrode tab is configured to penetrate through the hole in a direction perpendicular to the surface of the plate, and preferably has a thickness of 0.2 mm or more. More preferably, the thickness of the electrode tab may be 0.2 to 1.0 mm. Advantageously, when the electrode tab has a thickness of 0.2 mm or more, a weld bead having the above-described specific shape and having a dilution rate of the plate of less than 50% may be manufactured by laser welding.

In one embodiment, the plate has a thickness of 0.5 mm or more. For example, the plate may have a thickness of 0.5 mm to 10 mm, 1 mm to 8 mm, or 1 mm to 6 mm, but is not necessarily limited thereto.

In certain embodiments, a weld bead 170 may display symmetry based on a center line CL of a hole 150*c*, such as shown in FIG. 1. In this case, as the electrode tab 120 is inserted into the hole 150*c*, the center line CL of the hole 150*c* may be the same as the center line of the electrode tab. The left-right symmetry shown in FIG. 1 may mean that the shortest distance between each of the two boundary points p1 and p2 on the left and right and the center line of the hole is L1 and L2, respectively. In certain embodiments, the ratio of L1:L2 is 1:1 to 1.2, wherein, in instances when L1 and L2 are different, the longer length is set to be L2. Referring to FIG. 1, the left-right asymmetry may mean that the ratio of L1:L2 exceeds 1:1.2, and specifically, the ratio of L1:L2 is 1:1.2 to 3, and specifically, 1:1.2 to 2.5. The left-right symmetrical structure of the weld bead 170 may be mainly affected by the laser irradiation direction, and as described herein with respect to FIG. 4, this structure may appear when the laser is irradiated obliquely. As will be understood by a skilled artisan, a left-right asymmetric structure of the weld bead is not advantageous to the mechanical properties of the welded area, so it may be preferable that the weld bead of the present disclosure is substantially symmetrical and the left-right symmetry is satisfied (e.g., L1:L2 is 1:1 to 1.2). However, in certain embodiments, the mechanical properties (welding strength) of the welded area by generating a weld bead that satisfies Equations 1, 2, and optionally 3, 4, 5, 6, 7, 8, 9, and or 10, the mechanical properties may not be significantly affected by an asymmetric structure of a weld bead.

A battery cell comprising an electrode tab that is inserted into a plate and welded according to any embodiment disclosed herein may be any type of battery cell. For example, in one embodiment, the battery cell is a pouch-type battery cell. The pouch-type battery cell may be a secondary battery cell, in which an electrode assembly including a cathode, anode, and a separator interposed between the cathode and anode is sealed in a pouch while being impregnated with an electrolyte (electrolytic solution). The pouch may have a multilayer film structure in which a metal film, such as an aluminum film, is interposed between an outer layer film and an inner layer film, although the structure is not limited thereto. In one embodiment of a battery module assembled according to methods disclosed herein, the electrode tabs of each of the plurality of pouch-type battery cells stacked in one direction are inserted and welded into each hole in a plate, so the plurality of pouch-type battery cells may be electrically connected to each other.

Hereinabove, although the present disclosure has been described by specific matters, limited embodiments, and the accompanying drawings, they have been provided only for assisting in the entire understanding of the present disclosure. Therefore, the present disclosure is not limited to the exemplary embodiments. Various modifications and changes may be made by those skilled in the art to which the present disclosure pertains from this description.

Hereinafter, the present disclosure will be described in detail with reference to Examples, but these are for describing the present invention in more detail, and the scope of the present invention is not limited to the Examples below.

EXAMPLES

Examples 1 to 5 (E1-E5) and Comparative Examples 1 to 2 (CE1 and CE2)—Copper Plate Non-Plated CASE After inserting the aluminum electrode tab into the hole of the copper plate, a laser was irradiated obliquely to form a weld bead according to an embodiment of the present disclosure. The weld bead was implemented in each case satisfying various H/W ratios and copper contents as shown in Table 1 below, and the battery module including the same was prepared. The H/W ratio was derived through optical microscope image analysis (OM) of the weld bead, and the copper content (wt %) was derived through energy dispersive X-ray spectroscopy (EDS) analysis.

TABLE 1

| | E1 | E2 | E3 | E4 | E5 | CE1 | CE2 |
|---|---|---|---|---|---|---|---|
| $C_{M1}$ (wt %) | 45 | 33 | 27 | 14 | 21 | 56 | 9 |
| H/W ratio | 0.2 | 0.48 | 0.56 | 0.72 | 0.79 | 0.12 | 0.9 |

Examples 6 to 11 (E6-E11) and Comparative Example 3 (CE3)—Case of Nickel-Plating Layer Formed on Surface of Copper Plate After inserting the aluminum electrode tab into the hole of the copper plate on which the nickel-plating layer is formed on the surface, a laser was irradiated obliquely to form the weld bead according to an embodiment of the present disclosure. The weld bead was implemented in each case satisfying various H/W ratios and copper contents as shown in Table 2 below, and the battery module including the same was prepared.

TABLE 2

| | E6 | E7 | E8 | E9 | E10 | CE3 | CE4 |
|---|---|---|---|---|---|---|---|
| $C_{M1}$ (wt %) | 36 | 31 | 34 | 23 | 13 | 10 | 55 |
| H/W ratio | 0.2 | 0.31 | 0.4 | 0.5 | 0.68 | 0.78 | 0.12 |

Examples 12 to 16 (E12-E16) and Comparative Examples 4 and 5 (CE4 and CE5)—Case of Tin Plating Layer Formed on Copper Plate/Nickel Plating Layer After inserting the aluminum electrode tab into the hole of the copper plate on which the nickel-plating layer/tin plating layer are sequentially formed on the surface, a laser was irradiated obliquely to form the weld bead according to an embodiment of the present disclosure. The weld bead was implemented in each case satisfying various H/W ratios and copper contents as shown in Table 3 below, and the battery module including the same was prepared.

TABLE 3

| | E11 | E12 | E13 | E14 | E15 | CE5 | CE 6 |
|---|---|---|---|---|---|---|---|
| $C_{M1}$ (wt %) | 47 | 24 | 12 | 9 | 6 | 52 | 3 |
| H/W ratio | 0.11 | 0.21 | 0.29 | 0.34 | 0.42 | 0.02 | 0.48 |

Evaluation Example

In the welding process, the presence or absence of cracks on the surface of the weld bead was confirmed at macro and micro levels using a vision camera system. In addition, the presence or absence of one-sided welding was confirmed by analyzing a cross section using scanning electron microscopy (SEM). X denotes that no cracking occurred and O denotes occurrence of cracking. Similarly, X denotes that no one-sided welding occurred, and O denotes occurrence of one-sided welding.

In addition, in normal weld beads where uniform or one-sided welding did not occur, the weld cross section quality grade according to the generation of the intermetallic compound (IMC) was described by being classified into grades A to C.

TABLE 4

| Case of copper plate | | | | | | | |
|---|---|---|---|---|---|---|---|
| | E1 | E2 | E3 | E4 | E5 | CE1 | CE2 |
| $C_{M1}$ (wt %) | 47 | 42 | 33 | 27 | 21 | 56 | 9 |
| H/W ratio | 0.21 | 0.28 | 0.48 | 0.56 | 0.79 | 0.12 | 0.9 |
| Is Equation 3 satisfied? | | | YES | | | NO | NO |
| Is Equation 4 satisfied? | | | YES | | | NO | NO |
| Cracking | X | X | X | X | X | ○ | X |
| One-sided welding | X | X | X | X | X | X | ○ |
| Welding cross section quality grade | C | B | B | A | A | N/A | N/A |

As shown in Table 4, it can be confirmed that in Examples 1 to 5 according to an embodiment of the present disclosure, no cracks or one-side welding occurred on the surface of the weld bead, and thus high-quality weld beads were formed. In particular, as a result of comprehensive consideration of the intermetallic compound (IMC) content, the possibility of the crack occurrence, and the strength of the welded area, it can be seen that in Examples 4 and 5, the welding cross section quality grade was the most excellent as grade A, and, in Examples 2 and 3, the welding cross section quality grade was excellent as grade B.

On the other hand, in Comparative Example 1, it can be seen that cracks occurred on the surface of the weld bead, the strength of the welded area decreased, and the stable quality could not be implemented due to the welding defects, and in Comparative Example 2, the welding quality deteriorated due to the one-sided welding and the electrical characteristics deteriorated.

From this, it can be seen that when forming the weld bead, rather than simply minimizing $C_{M1}$ (wt %), the high-quality weld bead may be implemented when a specific range of optimized $C_{M1}$ (wt %) is satisfied, and at the same time, the H/W ratio is satisfied.

TABLE 5

| Case of nickel-plating layer formed on surface of copper plate | | | | | | | |
|---|---|---|---|---|---|---|---|
| | E6 | E7 | E8 | E9 | E10 | CE3 | CE4 |
| $C_{M1}$ (wt %) | 36 | 30 | 32 | 23 | 13 | 55 | 10 |
| H/W ratio | 0.2 | 0.31 | 0.4 | 0.5 | 0.68 | 0.12 | 0.78 |
| Is Equation 5 satisfied? | | | YES | | | NO | NO |
| Is Equation 6 satisfied? | | | YES | | | NO | NO |
| Cracking | X | X | X | X | X | ○ | X |
| One-sided welding occurs | X | X | X | X | X | X | ○ |
| Welding cross section quality grade | B | B | B | A | B | N/A | N/A |

As shown in Table 5 above, in Examples 6 to 10 in which the nickel-plating layer was formed on the surface of the copper plate according to an embodiment of the present disclosure, it can be seen that the high-quality weld bead was formed because no cracks or one-sided welding occurred on the surface of the weld bead. In particular, as a result of comprehensive consideration of the intermetallic compound (IMC) content, the possibility of the crack occurrence, and the strength of the welded area, it can be seen that in the case of Example 9, the welding cross section quality grade was the most excellent as grade A.

On the other hand, in Comparative Example 3, it can be seen that cracks occurred on the surface of the weld bead, the strength of the welded area decreased, and the stable quality could not be implemented due to the welding defects, and in Comparative Example 4, the welding quality deteriorated due to the one-sided welding and the electrical characteristics deteriorated.

From this, unlike Examples 1 to 5 which were non-plated cases, it can be seen that Examples 6 to 10, in which the nickel plating layer was formed on the surface of the copper plate, satisfied the optimized ranges of $C_{M1}$ (wt %) and H/W ratio of a specific range in order to implement the high quality weld bead.

TABLE 6

| | Case of tin plating layer formed on copper plate/nickel plating layer | | | | | | |
|---|---|---|---|---|---|---|---|
| Tin plating layer Case | E11 | E12 | E13 | E14 | E15 | CE5 | CE6 |
| $C_{M1}$ (wt %) | 47 | 24 | 12 | 9 | 6 | 52 | 3 |
| H/W ratio | 0.11 | 0.21 | 0.29 | 0.34 | 0.42 | 0.02 | 0.48 |
| Is Equation 7 satisfied? | | | YES | | | NO | NO |
| Is Equation 8 satisfied? | | | YES | | | NO | NO |
| Cracking | X | X | X | X | X | ○ | X |
| One-sided welding | X | X | X | X | X | X | ○ |
| Welding cross section quality grade | C | A | B | C | C | N/A | N/A |

As shown in Table 6 above, in Examples 11 to 15 in which the tin plating layer was formed on the copper plate/nickel plating layer according to an embodiment of the present disclosure, it can be seen that the high-quality weld bead was formed because no cracks or one-sided welding occurred on the surface of the weld bead. In particular, as a result of comprehensive consideration of the intermetallic compound (IMC) content, the possibility of the crack occurrence, and the strength of the welded area, it can be seen that in the case of Example 12, the welding cross section quality grade was the most excellent as grade A.

On the other hand, in Comparative Example 5, it can be seen that cracks occurred on the surface of the weld bead, the strength of the welded area decreased, and the stable quality could not be implemented due to the welding defects, and in Comparative Example 6, the welding quality deteriorated due to the one-sided welding and the electrical characteristics deteriorated.

From this, unlike Examples 1 to 5 which are the non-plated cases, and Examples 6 to 10 which are the nickel plating layer case, it can be seen that Examples 11 to 15 in which the tin plating layer is formed on the copper plate/nickel plating layer, satisfied a specific range of optimized $C_{M1}$ (wt %) and H/W ratio in order to implement the high quality weld bead.

According to the weld bead and the battery module including the same according to the present disclosure, it is possible to optimize the formation of the intermetallic compound (IMC) and have excellent mechanical characteristics and electrical characteristics to secure the stable quality.

In addition, according to the weld bead and the battery module including the same according to the present disclosure, it is possible to exhibit the optimal quality depending on the influence of various factors that affect the welding quality.

Hereinabove, although the present disclosure has been described by specific matters, limited embodiments, and the accompanying drawings, they have been provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to these exemplary embodiments, but the claims and all of modifications equal or equivalent to the claims are intended to fall within the scope and spirit of the present disclosure.

What is claimed is:

1. A battery module, comprising:

a plurality of battery cells each including an electrode tab; and at least one bus bar connected to a plurality of electrode tabs to electrically connect the plurality of battery cells to each other, wherein the bus bar comprising a plate of a first metal, the bus bar having holes for retention of the respective electrode tabs;

wherein a particular electrode tab is coupled to the plate via a weld bead satisfying Equations 1 and 2 below:

$$5 < C_{M1}(\text{wt }\%) < 50 \quad \text{[Equation 1]}$$

$$0.1 < H/W \text{ ratio} < 0.85, \quad \text{[Equation 2]}$$

wherein:

$C_{M1}$ denotes the concentration of the first metal contained in the weld bead;

H denotes the height of the weld bead; and

W denotes the width of the weld bead, wherein the first metal is copper, wherein the plate comprises a first plating layer comprising a second metal formed on a surface of the plate, wherein the plate further comprises a second plating layer formed on the first plating layer, wherein the second plating layer comprises a third metal.

2. The battery module of claim 1, wherein the weld bead satisfies Equations 3 and 4 below:

$$10 < C_{M1}(\text{wt }\%) < 50 \quad \text{[Equation 3]}$$

$$0.15 < H/W \text{ ratio} < 0.85. \quad \text{[Equation 4]}$$

3. The battery module of claim 1, wherein the second metal comprises at least one selected from the group consisting of nickel, silicon, magnesium, iron, manganese, zinc, chromium, lithium, calcium, and an alloy of any of the forgoing.

4. The battery module of claim 3, wherein the second metal is nickel.

5. The battery module of claim 4, wherein the weld bead satisfies Equations 5 and 6 below:

$$10 < C_{M1}(\text{wt }\%) < 50 \quad \text{[Equation 5]}$$

$$0.15 < H/W \text{ ratio} < 0.75. \quad \text{[Equation 6]}$$

6. The battery module of claim 1, wherein the third metal is tin.

7. The battery module of claim 6, wherein the weld bead satisfies Equations 7 and 8 below:

$$5 < C_{M1}(\text{wt }\%) < 50 \quad \text{[Equation 7]}$$

$$0.1 < H/W \text{ ratio} < 0.45. \quad \text{[Equation 8]}$$

8. The battery module of claim 1, wherein the weld bead comprises a cover part having a convex shape that covers the hole and a pillar part inserted into the hole.

9. The battery module of claim 1, wherein the weld bead satisfies Equation 9 below:

$$0 < A < 21T^2, \quad \text{[Equation 9]}$$

wherein:

A denotes the cross-sectional area of the weld bead in the thickness direction of the plate, and T is the thickness of the electrode tab.

10. The battery module of claim 1, wherein the weld bead has left-right symmetry with respect to a center line of the hole.

11. The battery module of claim 10, which exhibits a L1:L2 ratio of 1:1 to 1.2, wherein L1 and L2 are defined as the shortest distance from a center line of the weld bead to opposing boundary points of the weld bead, and wherein if L1 and L2 are different, L2 is the larger value.

12. The battery module of claim 1, wherein the plurality of battery cells are pouch-type battery cells.

13. A method of making a battery module comprising:

providing a plurality of battery cells, each including an electrode tab;

providing at least one bus bar comprising a plate comprising plurality of holes;

wherein the plate comprises a first metal;

inserting an electrode tab of each of the plurality of battery cells into each of the plurality of holes in the plate such that the electrode tab protrudes through the plate to create a protruding portion of the electrode tab; and irradiating the plate and electrode tab under conditions effective to bond the electrode tab to the plate, thereby creating a weld bead, wherein the weld bead satisfies Equations 1 and 2 below:

$$5 < C_{M1}(\text{wt }\%) < 50 \quad \text{[Equation 1]}$$

$$0.1 < H/W \text{ ratio} < 0.85, \quad \text{[Equation 2]}$$

wherein:

$C_{M1}$ is the concentration of the first metal in the weld bead;

H is the height of the weld bead; and

W is the width of the weld bead, wherein the first metal is copper, wherein the plate comprises a first plating layer comprising a second metal formed on a surface of the plate, wherein the plate further comprises a second plating layer formed on the first plating layer, wherein the second plating layer comprises a third metal.

14. The method of claim 13, wherein the plate and electrode tab are irradiated with a laser at an angle oblique to a central axis of the electrode tab.

15. The method of claim 13, wherein the second metal comprises at least one selected from the group consisting of nickel, silicon, magnesium, iron, manganese, zinc, chromium, lithium, calcium, and any alloy of any of the foregoing.

* * * * *